United States Patent [19]
Nakamura

[11] Patent Number: 5,091,012
[45] Date of Patent: Feb. 25, 1992

[54] COBALT TITANATE PARTICLES AND PROCESS FOR PRODUCING THE SAME

[75] Inventor: Tatsuya Nakamura, Hiroshima, Japan

[73] Assignee: Toda Kogyo Corp., Hiroshima, Japan

[21] Appl. No.: 714,174

[22] Filed: Jun. 14, 1991

[30] Foreign Application Priority Data

Jun. 25, 1990 [JP] Japan .................................. 2-167658

[51] Int. Cl.$^5$ .......................... C04B 14/00; C09C 1/36
[52] U.S. Cl. .................................... 106/440; 106/480; 423/594; 423/598; 501/134
[58] Field of Search ................. 106/440, 480; 501/134; 423/594, 598

[56] References Cited

U.S. PATENT DOCUMENTS

| | | | |
|---|---|---|---|
| 4,097,300 | 6/1978 | Balducci et al. | 106/440 |
| 4,696,700 | 9/1987 | Fischer et al. | 106/480 |

FOREIGN PATENT DOCUMENTS 778705 7/1957 United Kingdom .

OTHER PUBLICATIONS

Lewis, *Pigment Handbook*, 1988, p. 403.

Primary Examiner—William R. Dixon, Jr.
Assistant Examiner—Deborah Jones
Attorney, Agent, or Firm—Nixon & Vanderhye

[57] ABSTRACT

Disclosed herein are cobalt titanate particles having an average particle diameter in the range of 0.5–2.0 μm, said particles being mono-dispersed and having uniform particle size distribution.

4 Claims, 4 Drawing Sheets

(×3000)

(×3000)

COBALT TITANATE PARTICLES AND PROCESS FOR PRODUCING THE SAME

BACKGROUND OF THE INVENTION

The present invention relates to cobalt titanate particles and a process for producing such particles. More particularly, the present invention relates to the cobalt titanate particles which are mono-dispersed and have uniform particle size distribution, and a process for producing such particles.

A major use for the cobalt titanate particles of the present invention is in preparation of green pigments for coating materials and toner.

Recently, necessity is rising for the improvement of dispersibility of pigment particles in vehicle, their workability and thermal stability in the production of coating material so as to meet the requirement for enhancement of working efficiency in the age of energy saving and improvement of physical properties of the coats.

For the improvement of dispersibility and workability of pigment particles, it is essential that the said particles have a proper size and also uniform particle size distribution, and are mono-dispersed.

As for thermal stability, since the toner for development, whose demand is increasing recently with diffusion of copying machines, is heated to a high temperature above 150° C. in its production process, the pigment particles used as colorant for such toner are required to keep stable in color even at high temperatures above 150° C.

As green pigment particles, chrome green, zinc green and chrome oxide particles have been popularly used.

Also, as the green particles, cobalt titanate particles which is an ilmenite type oxide, are known. For the synthesis of such cobalt titanate particles, there is known, for instance, a method in which a mixture of CoO particles and TiO$_2$ particles is calcined at a high temperature as described in Journal of Physical Society of Japan, Vol. 13, No. 10, pp. 1110–1118, 1958.

The pigment particles with excellent dispersibility, workability and thermal stability are now the most acutely required. Any of the hitherto known green pigment particles has some problem or other and is unable to meet all the requirements. For instance, the chrome green is a mixture of prussian blue and chrome yellow, so that when a coating material is prepared therefrom, there is a possibility that both pigments might separate from each other. Also, the zinc green is a mixture of zinc yellow and prussian blue, and when a coating material is made therefrom, there might cause separation of both pigments. The chrome oxide is obscure green and lacks vividness. Further, each of the said chrome green, zinc green and chrome oxide, because of use of noxious chrome, has difficulties in handling both in the production process and in the disposal of the pigments, and is poor in workability.

Cobalt titanate particles are excellent in thermal stability, but since their production process involves a firing step at a high temperature and a pulverization step, there takes place sintering between the particles in the course of the production process and the obtained particles have irregular shape and non-uniform particle size distribution.

So, strong request has been voiced for such cobalt titanate particles which are harmless, can be used as a green pigment without mixing two or more different types of pigment, are free from sintering between particles, are mono-dispersed and have also uniform particle size distribution.

As a result of assiduous studies for obtaining the cobalt titanate particles without conducting high-temperature firing and pulverization, it has been found that by subjecting an alkaline suspension (pH 8.0–10.0) containing Co (II) and Ti (III) to an autclaving treatment at a temperature of 250°–300° C., CoTiO$_3$ particles which suffer from no sintering between particles, are mono-dispersed (discrete from each other) and have uniform particle size distribution, can be obtained. The present invention was attained on the basis of this finding.

SUMMARY OF THE INVENTION

In a first aspect of the present invention, there are provided cobalt titanate particles comprising CoTiO$_3$ particles having an average diameter within the range of 0.5–2.0 μm, said particles being mono-dispersed and having uniform particle size distribution.

In a second aspect of the present invention, there is provided a process for producing the cobalt titanate particles of the 1st aspect, which comprises subjecting an alkaline suspension with a pH of 8.0–10.0 containing Co (II) and Ti (III) to an autclaving treatment at a temperature in the range of 250°–300° C.

DETAILED DESCRIPTION OF THE INVENTION

Figure 1:
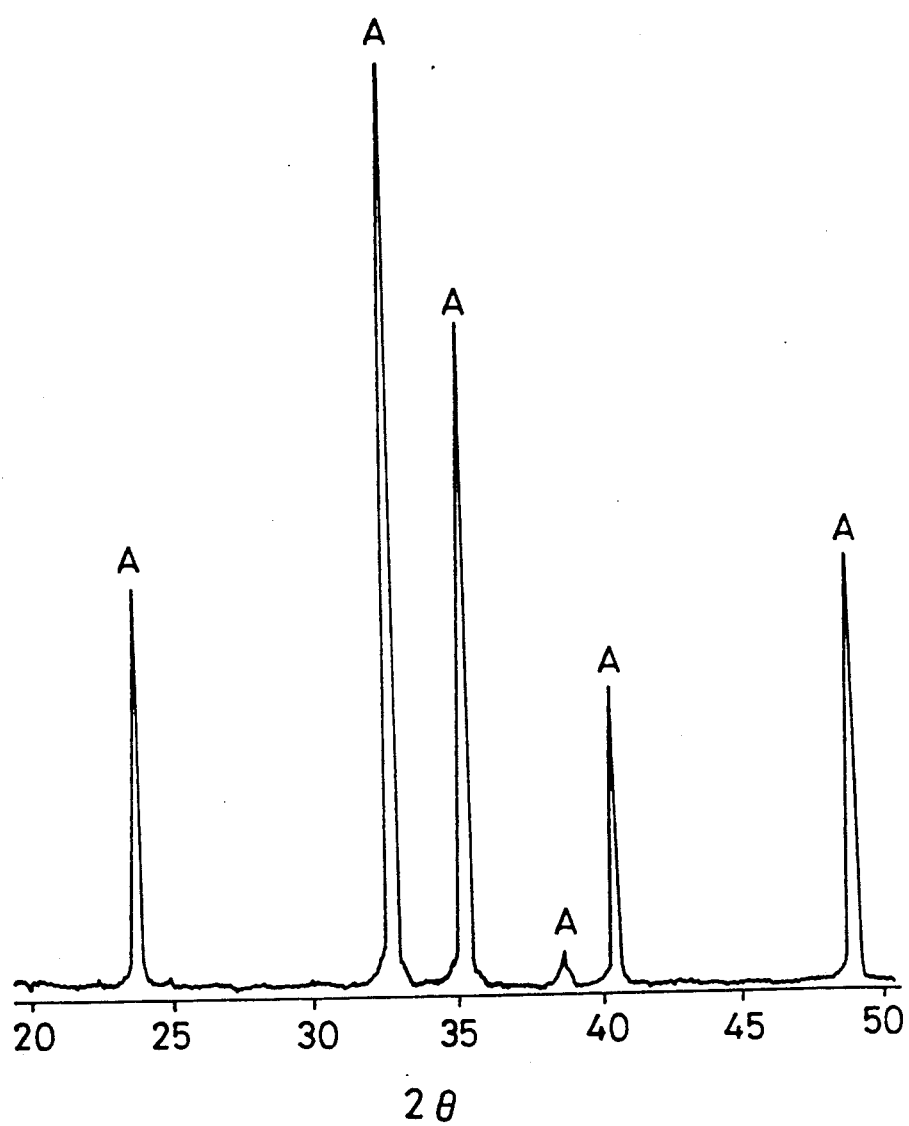
FIG. 1 and FIGS. 3 to 5 are X-ray diffraction patterns of the particles obtained in Example 1 and Comparative Examples 1 to 3, respectively.

The cobalt titanate particles according to the present invention are the green particles having an average diameter in the range of 0.5–2.0 μm.

In the composition of the cobalt titanate particles of the present invention, Ti is tetravalent as noted from the general formula CoTiO$_3$, but as described in the Examples and Comparative Examples, the particles of the composition of the formula CoTiO$_3$ are not produced when using Ti(IV) and they are produced only when Ti (III) is used.

The cobalt titanate particles of the present invention have a uniform particle size distribution in which a geometric standerd deviation ($\sigma_g$) is not less than 0.5.

The reason why CoTiO$_3$ is produced only when Ti-(III) is used, attribute this phenomenon to the facts that Ti (III) is a strong reducing reagent which can prevent oxidation of Co (II) in a high-temperature aqueous solution and that Ti (III) is selectively oxidized by oxygen dissolved in the solution to supply gradually Ti (IV), thereby making possible the co-precipitation of Co (II) and Ti (IV) in spite of the common knowledge in the art that co-precipitation hardly takes place when the difference in valency is large.

When an alkaline suspension of pH 8.0–10.0 containing Co (II) and Ti (III) is subjected to an autclaving treatment at a temperature in the range of 250°–300° C., the CoTiO$_3$ particles can be directly produced from an aqueous solution.

Cobalt sulfate, cobalt chloride and the like can be used as the Co (II) salt in the process of the present invention. Titanium trichloride and the like can be used as the Ti (III) salt in the process of the present invention.

Sodium carbonate, aqueous ammonia, sodium hydroxide and the like can be used as the alkali in the process of the present invention. Use of sodium carbonate or aqueous ammonia is preferred.

The reaction pH in the process of the present invention is defined in the range of 8.0–10.0. When the reaction pH is below 8.0, it is difficult to precipitate Co (II) and $TiO_2$ (anatase and rutile) alone is precipitated. When the reaction pH is higher than 10.0, spinel oxides containing Co (II) and Ti (IV) and $TiO_2$ (anatase and rutile) may be mingled in the produced $CoTiO_3$ particles.

In the process of the present invention, the reaction temperature is set within the range of 250°–300° C. When the relation temperature is below 250° C., spinel oxides containing Co (II) and Ti (IV) and $TiO_2$ (anatase and rutile) particles may be present in the produced $CoTiO_3$ particles. When the reaction temperature exceeds 300° C., although the $CoTiO_3$ particles can be obtained, the internal pressure may be elevated to a dangerous level.

Regarding studies on wet synthesizing processes for the ilmenite type oxides, in an experimental process, an alkaline solution (NaOH or $Na_2CO_3$ solution) was added to an aqueous solution of $MSO_4$ (M denoting a metal salt) and $TiCl_3$, and the obtained suspension was subjected to an autclaving treatment in an autoclave at 250° C. for 10 hours. In case Ni salt was used as a M salt, it was impossible to synthesize $NiTiO_3$ due to too high stability of the hydroxide $Ni(OH)_2$. In case Zn salt was used as a M salt, although $ZnTiO_3$ was produced in the weakly alkaline region, Zn (II) was mostly turned into $ZnCO_3$ and it was hardly possible to attain single-phase synthesis of $ZnTiO_3$. Also, in case Mg salt was used as a M salt, it was impossible to synthesize $MgTiO_3$ as $TiO_2$ was formed in the alkaline region.

The cobalt titanate particles obtained according to the present invention are mono-dispersed, since the particles can be produced directly from an aqueous solution as described in the Examples. Also, these particles show excellent dispersibility in vehicle and resin, as they have uniform particle size distribution. Further, these particles are excellent in workability, as they are the particles whose average diameter is defined in the range of 0.5–2.0 μm. In addition, these particles have excellent thermal stability. Therefore, the cobalt titanate particles according to the present invention are suited for use as green pigment particles for coating material or toner.

Moreover, as the cobalt titanate particles of the present invention have a moderate degree of hardness, their use as abrasive is also expected.

EXAMPLES

The present invention will be further described below with reference to the examples and comparative examples.

The average diameter of the particles in the Examples and Comparative Examples shown below is the average of the values determined from the electron micrographs.

The particle size distribution of the particles in Examples is represented by a geometric standard deviation ($\sigma_g$) measured by the following method.

A particle diameter of each 250 particle in an electron micrograph ($\times 12,000$) was determined and an actual particle diameter was calculated therefrom. A cumulative amount (%) obtained from the number of the particles belonging to each regular interval of the particle diameter was plotted in a logarithmicro-normal probability paper with particle diameter (μm) as abscissa and cumulative amount (%) as ordinate in accordance with a statistical method from the actual particle diameter and the number of the particles. A particle diameter ($D_{50}$) when the cumulative amount is 50% and a particle diameter ($D_{84.13}$) when the cumulative amount is 84,13%, were read out of the obtained log-nomal distribution graph. The geometric standard deviation ($\sigma_g$) was found by dividing the particle diameter ($D_{50}$) by the particle diameter ($D_{84.13}$) [$\sigma_g = D_{50}/D_{84.13}$].

EXAMPLE 1

By mixing 0.10 mol of $CoSO_4$, 0.10 mol of $TiCl_3$ and 0.275 mol of $Na_2CO_3$, 300 ml of an alkaline suspension with a pH of 10.0 were prepared. The resultant alkaline suspension was put into an autoclave, heated to 250° C. and maintained at this temperature for 5 hours with mechanical stirring lasted throughout, thereby obtaining a green precipitate. After cooling to room temperature, the green precipitate was filtered out, washed with water and dried in the usual way.

Figure 2:
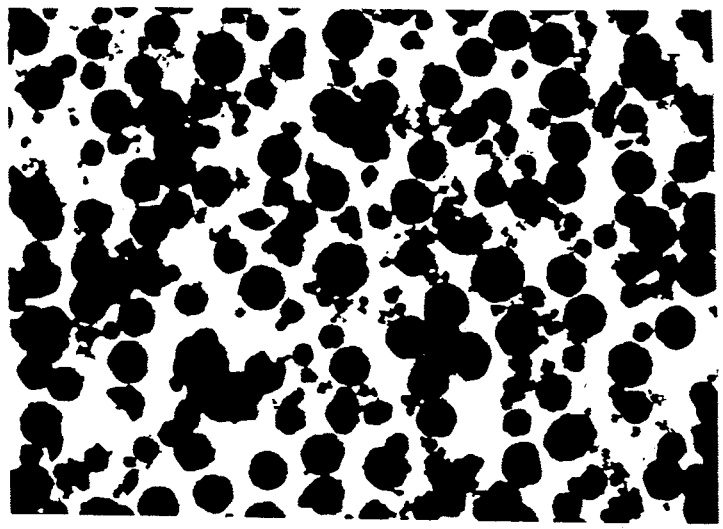
FIG. 2 is an electron micrograph ($\times 3000$) showing the structure of a spherical cobalt titanate particle obtained in Example 1.

From the result of examination of the X-ray diffraction pattern shown in FIG. 1 and the Néel point, the obtained green particles were confirmed to be $CoTiO_3$ particles. Also, as seen from an electron micrograph ($\times 3000$) shown in FIG. 2, the obtained particles were the spherical particles having an average diameter of 2.0 μm and a geometric standard deviation ($\sigma_g$) of 0.67. It is also noted that the obtained particles were mono-dispersed and had uniform particle size distribution. In FIG. 1, peak A refers to cobalt titanate.

EXAMPLE 2

By mixing 0.10 mol of $CoSO_4$, 0.10 mol of $TiCl_3$ and 0.26 mol of $Na_2CO_3$, 300 ml of an alkaline suspension having a pH of 8.5 were prepared. The resultant alkaline suspension was put into an autoclave, heated to 300° C. and maintained at this temperature for 5 hours with mechanical stirring lasted throughout, thereby obtaining a green precipitate. After cooling to room temperature, the green precipitate was filtered out, washed with water and dried in the usual way.

From the result of examination of the X-ray diffraction pattern and Neel point, the obtained green particles were determined to be $CoTiO_3$. It was also confirmed from the result of electron microscopical observation that the obtained particles were the granular particles having an average diameter of 0.5 μm and a geometric standard deviation ($\sigma_g$) of 0.80, and that the particles were mono-dispersed and had uniform particle size distribution.

COMPARATIVE EXAMPLE 1

The procedure of Example 2 was followed for preparing an alkaline suspension and for forming a light green precipitate from said suspension, except for the use of $TiCl_4$ in place of $TiCl_3$ in the preparation of the alkaline suspension. After cooling to room temperature, the formed light green precipitate was filtered out, washed with water and dried in the usual way.

Figure 3:
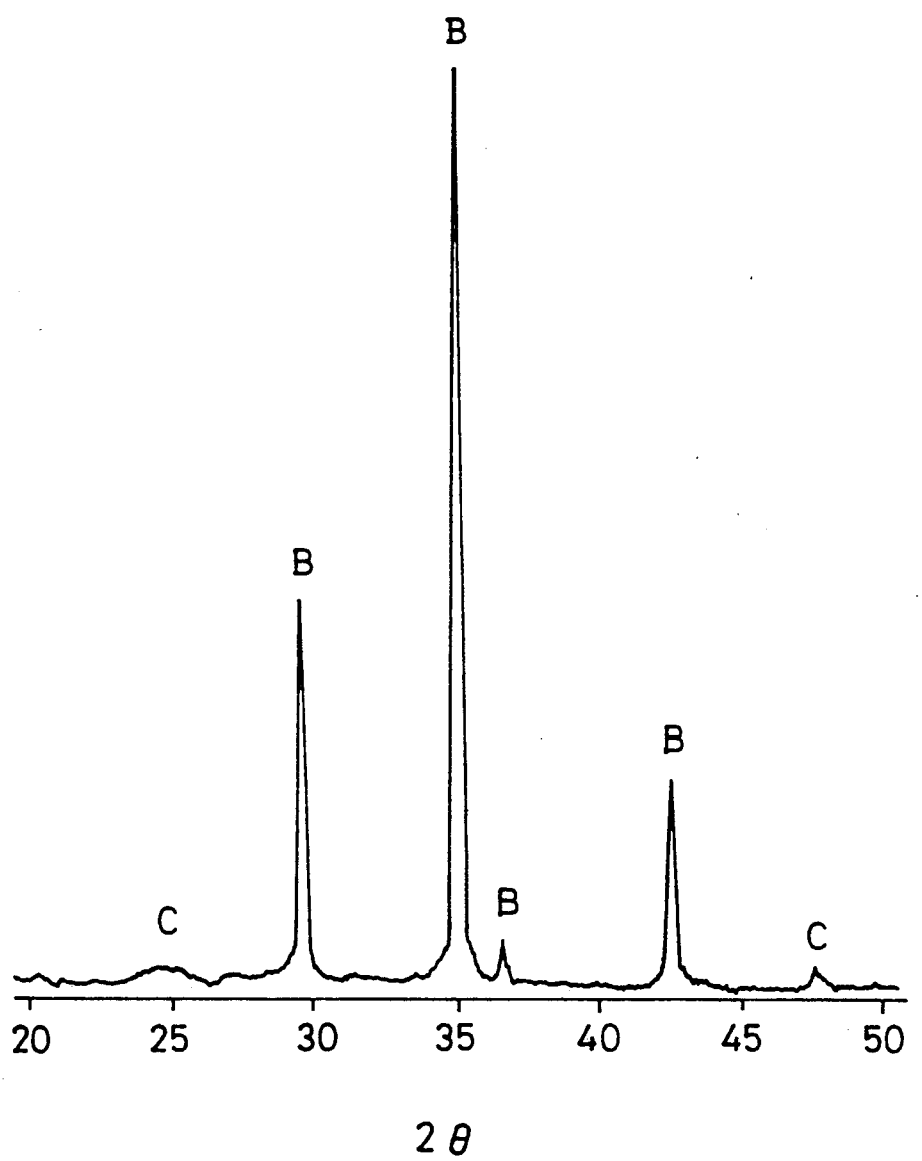

The obtained light green particles, as noted from the X-ray diffraction pattern shown in FIG. 3, were the mixed particles having titanium oxide mingled in a spinel oxide. In FIG. 3, peak B refers to spinel oxide and peak C refers to titanium oxide.

COMPARATIVE EXAMPLE 2

The procedure of Example 2 was followed for preparing an alkaline suspension and for forming a light green precipitate from said suspension, except for the use of 3.0 mol of NaOH in place of 0.26 mol of $Na_2CO_3$ for preparing the alkaline suspension with a pH of 14. After cooling to room temperature, the formed light green precipitate was filtered out, washed with water and dried in the usual way.

Figure 4:
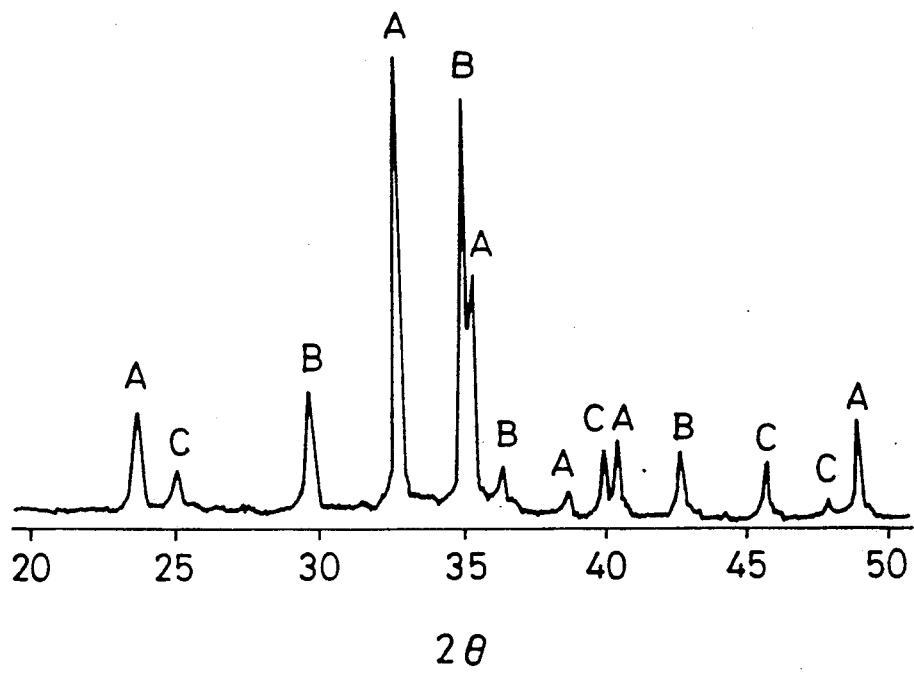

The obtained light green particles, as noted from the X-ray diffraction pattern shown in FIG. 4, were the mixed particles in which a spinel oxide and a small quantity of titanium oxide were mingled in a $CoTiO_3$ oxide. In FIG. 4, peak A refers to cobalt titanate, peak B refers to spinel oxide and peak C refers to titanium oxide.

COMPARATIVE EXAMPLE 3

The procedure of Example 2 was followed for preparing a suspension and for forming a white precipitate from said suspension, except for the use of 0.20 mol of NaOH in place of 0.26 mol of $Na_2CO_3$ for preparing a neutral suspension with a pH of 7.0. After cooling to room temperature, the formed white precipitate was filtered out, washed with water and dried in the usual way.

Figure 5:
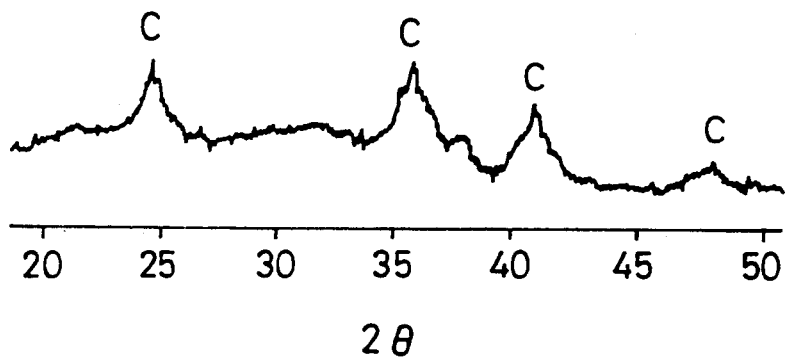

In the X-ray diffraction pattern of the obtained particles shown in FIG. 5, there appeared only a peak attributable to titanium oxide. In FIG. 5, peak C refers to titanium oxide.

COMPARATIVE EXAMPLE 4

The procedure of Example 2 was followed for preparing an alkaline suspension and for forming a light green precipitate from said suspension, except that the reaction temperature was set at 180° C. After cooling to room temperature, the formed light green precipitate was filtered out, washed with water and dried in the usual way.

The obtained particles were the mixed particles having a spinel oxide and titanium oxide mingled in the cobalt titanate particles.

What is claimed is:

1. Cobalt titanate particles comprising $CoTiO_3$ having an average particle diameter in the range of 0.5-2.0 μm, said particles being mono-dispersed and having uniform particle size distribution.

2. Cobalt titanate particles according to claim 1, wherein said particles have a particle size distribution in which a geometric standard deviation ($\sigma_g$) is not less than 0.5.

3. A process for producing cobalt titanate particles as defined in claim 1, which comprises preparing an alkaline suspension containing Co (II) and Ti (III) and having a pH of 8.0–10.0 and subjecting said solution to an autclaving treatment at a temperature in the range of 250°–300° C. for a time sufficient to precipitate mono-dispersed cobalt titanate particles.

4. Cobalt titanate particles having an average particle diameter of 0.5 to 2.0 μm and being mono-dispersed and having uniform particle size distribution, which are obtained by the process of claim 3.

* * * * *